Patented Oct. 12, 1954

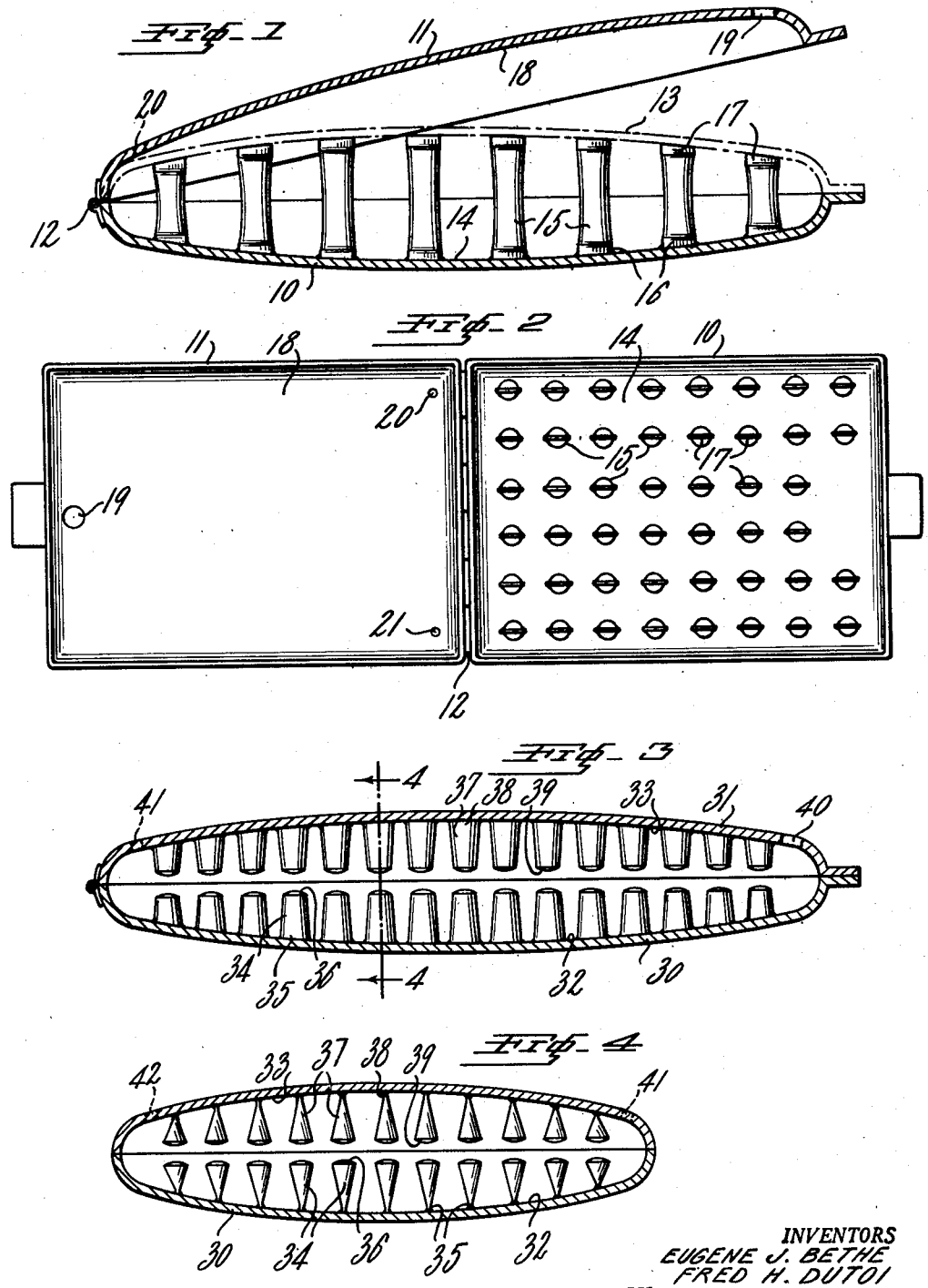

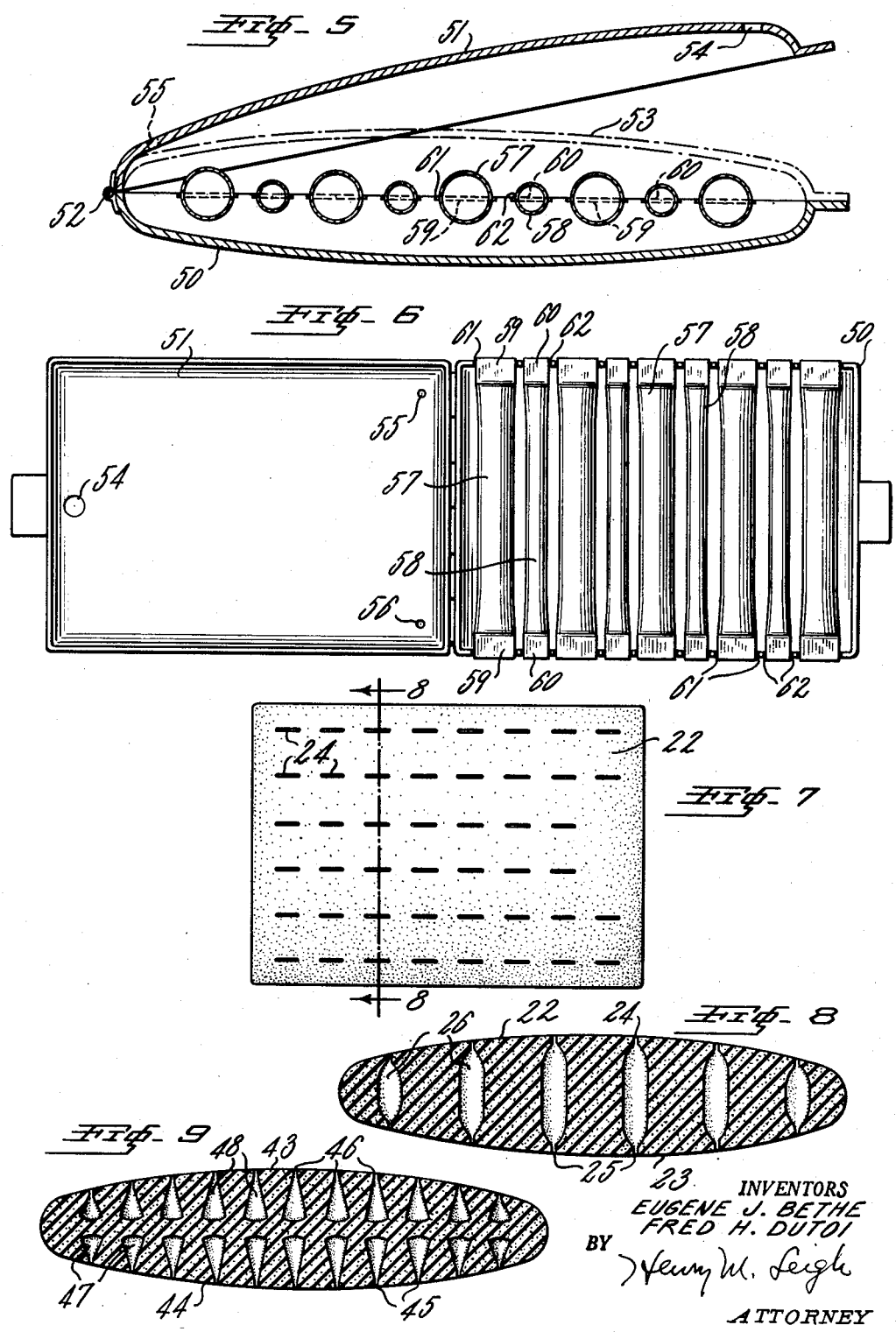

2,691,190

UNITED STATES PATENT OFFICE 2,691,190

APPARATUS FOR MAKING REVERSIBLE SPONGE CUSHIONS

Eugene J. Bethe and Fred H. Dutoi, Mishawaka, Ind., assignors to United States Rubber Company, New York, N. Y., a corporation of New Jersey Application April 2, 1951, Serial No. 218,844

2 Claims. (Cl. 18—39)

This invention relates to apparatus for making reversible one-piece molded cushions of sponge rubber or like material having a plurality of internal parallel spaced tubular-shaped cavities.

Non-reversible or so-called open-type foam sponge cushions for seat and back cushions for automobiles and upholstery are made of a unitary molded construction of the desired shape with substantially parallel spaced openings or cored out cavities extending from the base of the cushion toward the opposite face but terminating short of such opposite face to provide a smooth seating or back-resting surface of the cushion. The cavities are formed by cores extending into the mold proper into which the latex foam is poured, as shown in U. S. Patents Nos. 2,310,830 and 2,347,117. The latex foam is gelled and vulcanized and the vulcanized sponge cushions which have a smooth skin formation on the outer surfaces from contact with the smooth inner mold surface are manually stripped from the molds. Stripping is a time consuming operation and must be done with great care to avoid tearing the foam rubber sponge. Reversible cushions are made by cementing together two molded half-sections of foam sponge cushions, which are similar to open-type cushions, the surfaces from which the core openings extend being cemented together. Before cementing, the half sections are tested for compression resistance and those having the same resistance are matched. The entire outer surface of such a cushion has a smooth skin formation since the halves were molded against the smooth inside surface of the mold, the only break in the continuity of such smooth outer surface of the cushion being the fine lined butt joint, which is not objectionable, running around the side of the cushion intermediate the top and bottom faces where the inner surfaces of the half sections were cemented at their edge portions. Such a cushion has a plurality of internal parallel spaced tubular shaped cavities formed from the cored openings in the molded half-sections. Reversible cushions of various types, seat and back cushions and bed pillows, have been made in this manner, as shown in U. S. Patent 2,315,391. Because two molded half-sections are required to produce each cushion, the damage due to stripping is high. Other disadvantages are that each half-section must be trimmed of flash and carefully matched with another having the same compression resistance. Additional labor is required to cement the half-sections together. Also, the manufacture of such reversible cushions has an additional disadvantage in the larger number of molds and increased vulcanizer space that are needed.

The object of the present invention is to manufacture in a single molded piece reversible cushions of a spongy rubber-like material such as from foamed latex having a plurality of internal parallel spaced tubular-shaped cavities and a smooth skin texture over their entire exposed surface.

The foregoing and other objects are accomplished as pointed out hereinafter and as shown in the accompanying drawings in which:

Figure 1 is a vertical cross section lengthwise of one form of mold in partly open position, for making a cushion according to the present invention;

Figure 2 is a reduced top view of the mold of Fig. 1 in open position;

Figure 3 is a vertical cross section lengthwise of a modification of the mold of Figs. 1 and 2, in closed position, for making a cushion according to the present invention;

Figure 4 is a vertical cross section widthwise of the mold on the line 4—4 of Figure 3;

Figure 5 is a vertical cross section lengthwise of another modification of a mold, in partly open position, for making a cushion according to the present invention;

Figure 6 is a reduced top view of the mold of Fig. 5 in open position;

Figure 7 is a top view of a cushion made in the mold of Fig. 2;

Figure 8 is an enlarged sectional view on line 8—8 of Fig. 7; and

Figure 9 is a sectional view similar to Fig. 8 but of a cushion made in the mold of Figs. 3 and 4.

The cushion of the present invention is preferably made of foamed rubber latex. Foamed rubber latex, natural and/or synthetic, may be prepared by whipping the compounded latex containing a foaming agent into a froth or foam, or by stirring the compounded latex into a separately prepared froth or foam. The latex may also be foamed by chemically evolving a gas in the latex as by the decomposition of hydrogen peroxide or a carbonate in the latex in known manner. The latex from which the foam is prepared or the thus prepared latex foam may have a delayed coagulant or gelling agent added to it before the foam is poured into molds or onto conveyors. The foam may be gelled and vulcanized and the sponge rubber product stripped from the molds or conveyor. The technique of preparing latex foams, and molding and gelling and vulcanizing the same is conventional today as illustrated in various patents, such as U. S. Patents 1,852,447, 2,126,275, 2,290,729, 2,309,005, 2,347,117 and 2,441,235. The reversible cushion of the present invention is molded in a single piece in the mold constructed in accordance with the present invention. On stripping from the mold surface, the cushion will have a desirable smooth outer skin formation from being molded against the smooth inner surface of the mold. The outer skin surface of the cushions will have a plurality of slits therein formed by separation of the cushions and the cores which form the tubular shaped cavities in the cushion. In the cushions made in the molds of Figs. 1 to 4, these slits are in the skin surface of one or more faces of the cushions and have a definite function in improving sponge cushion constructions. This will be evident from the detailed description below. In the cushions made in the molds of Figs. 5 and 6, these slits are along the edges of the cushion formed at the parting line of the mold halves.

Referring more particularly to Figs. 1 and 2, the cushion mold shown therein is made of metal and comprises the two registering cavitied mold sections or halves 10 and 11 which are hinged at 12 so that the mold may be opened for removal of the finished cushion, and closed for filling the hollow formed by the cavities in the mold sections with latex foam for shaping and gelling in the usual manner of making foam sponge cushions. The mold is shown in partly open position in Fig. 1, and in closed position in the broken line position 13. Fig. 2 is a top view of the mold with the two halves 10 and 11 in open position. The inside surface 14 of the mold section 10 has a series of regularly disposed parallel spaced hollow tubular cores flattened at each end at 16 and 17 with the flattened ends 16 attached as by welding to the surface 14, and with the axis of the tubular cores at an angle to the surface 14. The tubes 15 are shown round in cross section, but may be of any desired cross section, elliptical, triangular, square or any polygonal tubing, with the ends flattened as at 16 and 17. The length of the tubes are shown equal to the internal depth of the closed mold, i. e., the distance between the inner surface 14 of mold half 10, and the inner surface 18 of mold section 11 in closed position, the flattened ends of the cores thus contacting the opposite inner surfaces 14 and 18 which are crowned to form conventional crowned surfaces on the faces of the cushion molded therein. The mold section 10 is provided with a port 19 for the introduction of latex foam into the closed mold and air vents 20 and 21 for aid in filling the mold with the foam.

In practice, the mold halves 10 and 11 are closed and clamped and latex foam is introduced into the hollow mold through the entrance port 19 until foam exudes through the air vents 20 and 21. If desired, the two mold sections may be filled with foam by pouring into the open sections. The foam is stiff enough to remain in the sections while the mold is being closed. In such case, the entrance port 19 and/or the air vents 20 and 21 may be omitted from the mold construction. The mold filled with foam is passed through a heating chamber to gel the foam and vulcanize the cushion. In passing the molds through the heating chamber, the molds should be placed so that the tubes 15 are in a horizontal position to prevent sagging of the foam with consequent distortion of the cushion. The gelled cushion is removed from the mold by opening the mold and stripping the cushion from the mold half 10 by pulling the cushion away from the cores 15, the cores being separated from the cushion through the slits formed in the crowned surface of the cushion by the flattened ends of the cores. The finished cushion, as shown in Figs. 7 and 8, will have two crowned surfaces 22 and 23 of smooth skin texture from being molded against the inner surfaces 14 and 18 of the mold halves 10 and 11. The surfaces 22 and 23 will have a plurality of slits 24 and 25 from the flattened ends 16 and 17 of the cores 15. The slits 24 and 25 are of a depth equal to the depth of the flattened ends 16 and 17 and connect with the ends of the parallel spaced tubular shaped cavities 26 in the interior of the cushion which are formed by the cores 15 in the molding operation. The cores 15 attached to the inside surface 14 of the mold half 10 may be of a height less than the inside depth of the closed mold, in which case, the slits in the cushion will only be in the one crowned surface of the cushion. In such case the ends of the cores 15 opposite to the flattened ends attached to the mold surface 14 need not be flattened, and may be closed with a domed end or otherwise closed; in other words, the cores 15 will be flattened at one end which is attached to the mold surface 14 and closed at the other end in any desired manner. The inner mold surface 14 may be separate from the mold half 10 proper, as by welding the pinched ends 16 of the cores 15 to a crowned metal sheet which may readily be inserted in slots in the inside of the mold half 10, such sheet thus becoming a detachable inner surface of the mold half 10. In this manner one mold may be used for the manufacture of cushions with different cavitied constructions by inserting the sheet with the requisite attached cores in the mold half 10. The inside surfaces of the mold halves may be flat instead of crowned, if desired, to give cushions with flat faces.

Figs. 3 and 4 illustrate a modification of the mold of Figs. 1 and 2 in which each mold half or section 30 and 31 has a series of upstanding regularly disposed parallel spaced hollow tubular cores flattened at one end which is attached as by welding to the inside crowned surfaces 32 and 33 of the mold halves 30 and 31 respectively. Thus cores 34 with one end flattened at 35 and the other end closed in a domed end at 36, are attached as by welding at the pinched ends 35 to the inside surface 32 of the mold half 30, and tubes 37 with one end flattened at 38 and the other end closed in a domed end at 39 are attached as by welding at the flattened ends 38 to the inside surface 33 of the mold half 31. The cores are shown round but may be of any desired cross section, elliptical, triangular, square or any polygonal tubing, with one end flattened as at 35 and 38. The other ends 36 and 38 of cores 34 and 37 are closed and are shown domed. Such other ends of the tubular cores may be closed by flattening or in any other manner. One mold half 31 has a port 40 for the introduction of the latex foam similar to the port 19 in Figs. 1 and 2, and air vents 41 and 42 similar to air vents 20 and 21 in Figs. 1 and 2. The cores 34 in the mold half 30 are shown in Figs. 3 and 4 in register with the cores 37 in the mold half 31, so that the cores may be of a length up to one-half the interior depth of the closed mold. As also shown in the drawings, the cores are of a length less than one-half the interior depth of the closed mold, the space left between the core ends making a sponge web intermediate the cushion with the tubular shaped cavities on each side of the sponge web. If desired, the cores in one mold half may be staggered with the cores in the other mold half, with the closed ends of the cores which are not attached to an internal mold surface closed in any desired manner. When staggered, the cores may be of a length less than one-half the internal depth of the closed mold, or equal to one-half such depth or of a length greater than one-half the internal depth of the closed mold up to the full internal depth of the closed mold. The mold halves need not be hinged, but may be registered, as with pins and holes, by vertically placing one mold half on the other mold half.

In practice, the mold is closed, filled with foam as described above for the mold of Figs. 1 and 2, and heated to gel and vulcanize the sponge. If desired, the two mold halves may be filled with foam and closed as described above for the mold of Figs. 1 and 2. The molds should pass through the heater with the tubular cores horizontal. The stripping of the sponge from the mold of Figs. 3 and 4 is somewhat easier than from the mold of Figs. 1 and 2, because of the shorter lengths of cores from which to strip the sponge cushion. As described above with reference to the mold of Figs. 1 and 2, it is advantageous to weld the cores 34 and 37 of the mold of Figs. 3 and 4 to crowned sheets which may be inserted in slots in the inside of the mold halves 30 and 31, such sheets thus becoming detachable inner surfaces of the mold halves 30 and 31.

The cushion made in the mold of Figs. 3 and 4 is shown in Fig. 9 and will have two crowned surfaces 43 and 44 of smooth skin texture from being molded against the inner surfaces 32 and 33 of the mold sections 30 and 31. The surfaces 43 and 44 will have a plurality of slits 45 and 46 from the flattened ends 35 and 38 of the cores 34 and 37. The slits 45 and 46 are of a depth equal to the depth of the flattened ends 35 and 38 and connect with the parallel spaced tubular-shaped cavities 47 and 48 in the interior of the cushion which are formed from the body of the cores 34 and 37 in the molding operation.

The slits in the crowned surfaces of the cushions which lead into the tubular-shaped cavities in the cushions of Figs. 7 to 9 have a very definite advantage in cushion construction, particularly for bed pillows, which are the type of cushions more particularly illustrated in the drawings, conventional pillows made by cementing together two cored out half-sections, have a smooth skin formation on the outer surface which is less porous than the internal sponge structure. When one lays his head on such a pillow, the air inside the cored cavities must be expelled rather quickly and with slight pressure. The skin on the pillow restricts the flow of air. Consequently, this pillow is not immediately responsive to changes in pressure. The air squeezes out very slowly and the head slowly sinks down until the cushion becomes compressed. With slitted construction of the pillows shown in Figs. 7 to 9, the pillow deflects immediately, since there is no time lapse between the application of the pressure and the ready escape of the air from the interior through the slits. This definite advantage overcomes the objection that many people have to foam sponge pillows in that they "fight back." There are also other advantages in having a multiplicity of slits in the surface. A bellows effect resulting from the expulsion of air through the slits makes the pillow cool to sleep on, and the slits break up the tension on the tough outer skin.

Another modification of the present invention is shown in the mold of Figs. 5 and 6, which comprises two mold sections or halves 50 and 51, hinged at 52. The mold is shown in partly open position in Fig. 5, and in closed position in the broken line position 53. Fig. 6 is a top view of the mold with the halves 50 and 51 in open position. The mold half 51 is provided with a port 54 for the introduction of the latex foam and air vents 55 and 56 for aid in filling the closed mold with the foam. A plurality of large and small tubular cores 57 and 58, respectively, having opposite flattened ends 59 for the cores 57, and 60 for the cores 58, are disposed widthwise of the mold and intermediate the crowned inner surfaces thereof by resting the pinched ends thereof across the open face of the mold half 50 in contact with the inside surface of the mold. The side walls of the mold half 50 have shallow grooves or slots 61 and 62 cut in them to receive the flattened ends 59 and 60 of the cores 57 and 58 to prevent them from becoming dislocated. The depth of these slots or grooves is equal to the thickness of the flattened ends of the cores so that the mold halves 50 and 51 will fit tightly together to give a closed mold cavity.

In practice the tubes 57 and 58 are put in place widthwise and intermediate the crowned inner surfaces of the mold; the mold is filled with foam, and heated to gel and vulcanize the foam. The cores should be in horizontal position during the heating and gelling operation. The cushion may readily be removed after opening the mold and the cores 57 and 58 are separated from the cushion through the slits in the edge surface of the cushion made by the flattened ends of cores. In that the sponge rubber of the cushion is very flexible, there is no difficulty in removing the tubular cores through the slits in the surface of the sponge cushions made in the various molds of Figs. 1 to 6.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. Apparatus for molding reversible foam sponge cushions comprising registering mold sections having cavities which cooperate to form the hollow of the mold for shaping a foam cushion therein, the mold when in closed position having a plurality of tubular-shaped cores disposed in parallel relation in the hollow of the mold, each such core having two flattened ends which are in contact with the inside surface of the mold, such flattened ends producing slits in the surface of a sponge cushion made in the mold, whereby said tubular-shaped cores may be removed from inside a sponge cushion made in the mold through the slits thus made in the surface of the cushion.

2. Apparatus for molding reversible foam sponge cushions comprising registering mold sections having cavities which cooperate to form the hollow of the mold for shaping a foam cushion therein, the mold when in closed position having a plurality of tubular-shaped cores disposed in parallel relation in the hollow of the mold, each such core having two flattened ends which are in contact with the inside surface of the mold where the mold sections are in register, such flattened ends producing slits in the surface of a sponge cushion made in the mold, whereby said tubular-shaped cores may be removed from inside a sponge cushion made in the mold through the slits thus made in the surface of the cushion.

References Cited in the file of this patent

UNITED STATES PATENTS

| Number | Name | Date |
|---|---|---|
| 1,277,179 | Beynon | Aug. 27, 1918 |
| 2,025,712 | Bickett | Dec. 31, 1935 |
| 2,083,484 | Zampol | June 8, 1937 |
| 2,234,927 | Kubaugh | Mar. 11, 1941 |
| 2,295,363 | Schott | Sept. 8, 1942 |
| 2,315,391 | Blair | Mar. 30, 1943 |
| 2,358,962 | Cunningham | Sept. 26, 1944 |
| 2,364,036 | MacKay et al. | Nov. 28, 1944 |
| 2,371,788 | Weeber | Mar. 20, 1945 |
| 2,560,783 | Scott | July 17, 1951 |